(12) United States Patent
Karpy

(10) Patent No.: US 6,591,979 B1
(45) Date of Patent: Jul. 15, 2003

(54) SANITARY CONVEYOR FRAME

(75) Inventor: Daniel P. Karpy, Tampa, FL (US)

(73) Assignee: Material Systems Engineering Corp., Tampa, FL (US)

( * ) Notice: Subject to any disclaimer, the term of this patent is extended or adjusted under 35 U.S.C. 154(b) by 0 days.

(21) Appl. No.: 10/251,247

(22) Filed: Sep. 20, 2002

(51) Int. Cl.[7] .............................................. B65G 21/08
(52) U.S. Cl. ................................. 198/860.1; 198/860.1
(58) Field of Search ........................ 198/860.1, 860.2, 198/837

(56) References Cited

U.S. PATENT DOCUMENTS

| | | |
|---|---|---|
| 819,908 A | 5/1906 | Miller |
| 1,817,373 A | 8/1931 | Hopkins |
| 3,292,772 A | 12/1966 | Rice |
| 3,508,642 A | 4/1970 | Standley et al. |
| 3,584,731 A | 6/1971 | Dahlem et al. |
| 3,596,752 A | 8/1971 | Garvey |
| 3,800,938 A | 4/1974 | Stone |
| 3,874,497 A | 4/1975 | Carlson |
| 4,146,126 A | 3/1979 | Mattos |
| 4,511,031 A * | 4/1985 | Lachonius .................. 198/836 |
| 4,934,516 A * | 6/1990 | Dugan ...................... 198/836.4 |
| 5,082,108 A * | 1/1992 | Douglas ................... 198/836.4 |
| 5,098,248 A | 3/1992 | McFall |
| 5,178,263 A * | 1/1993 | Kempen ................... 198/860.2 |
| 5,186,314 A * | 2/1993 | Clopton .................... 198/860.2 |
| 5,314,059 A * | 5/1994 | Clopton .................... 198/860.1 |
| 5,562,202 A * | 10/1996 | Newcomb et al. ......... 198/860.1 |
| 6,296,111 B1 | 10/2001 | Mekanik et al. |
| 6,474,463 B1 * | 11/2002 | Wolfel ...................... 198/465.4 |

FOREIGN PATENT DOCUMENTS

EP    0 634 346    * 1/1995 .............. 198/860.2

OTHER PUBLICATIONS

Nercon Engineering & Manufacturing, Inc.; Modular Conveyor Components; not dated; 17 numbered pages; USA.

* cited by examiner

Primary Examiner—Douglas Hess
(74) Attorney, Agent, or Firm—David W. Pettis, Jr., PA

(57) ABSTRACT

An improved sanitary conveyor mechanism wherein the improvement is in the conveyor frame, including an elongated conveyor support and a plurality of frame members, each including an aperture formed therethrough for receiving the elongated conveyor support so that a sanitary conveyor of various configurations may be assembled and, and perhaps most importantly, easily cleaned.

4 Claims, 6 Drawing Sheets

SANITARY CONVEYOR FRAME

BACKGROUND OF THE INVENTION

1. Field of the Invention

The present invention relates to conveyors including a motor-driven endless conveyor belt for transporting articles and mounted on legs above a support surface of the type and construction suitable for use where conditions of high cleanliness are required such as, for example, in the food industry and in the pharmaceutical industry. The invention is particularly characterized by the construction of its principal frame elements, those elements comprising an elongated conveyor support extending longitudinally along the length of the conveyor and a plurality of frame members mounted on the conveyor support in spaced apart relation to each other and including structural features whereby guide rails for the articles being conveyed, the endless belt itself, and support legs may be attached without enclosing the conveyor such that all structural elements can be easily and efficiently cleaned to maintain an extremely sanitary working environment.

2. Description of the Prior Art

It is, of course, well known in the prior art to construct conveyor mechanisms including a motor-driven endless conveyor belt for transporting articles and mounting that mechanism on legs above a support surface. However, when such conveyors are used for handling, transporting, or packaging food products and pharmaceuticals, maintaining the cleanliness of the conveyor is a necessity. Most such prior art conveyor mechanisms are of a construction that effectively encloses substantial portions of the conveyor with panels or covers, and this is frequently done for purposes of structural integrity, and, sometimes, in order to protect the operators from moving parts. While safety and structural integrity are certainly important, maintaining such state-of-the-art conveyor mechanisms at the required level of cleanliness becomes both a laborious and expensive operation.

Not only is it necessary essentially to disassemble the conveyor mechanism for cleaning, but also additional time and effort must then be expended to re-assemble the conveyor. In reality, the additional time and expense are frequently minimized by not removing all side panels and covers, necessarily resulting in inadequate, if not improper, cleaning of the equipment. If the conveyor is being used to handle raw food products, this necessarily increases the likelihood of contamination. Such would, of course, also be true with regard to any product wherein the maintenance of a high degree of cleanliness is required.

While there have been attempts to overcome these problems of cleaning sanitary conveyor mechanisms, in actuality present solutions are inadequate. It is therefore clear that there remains a great need in the art for an improved sanitary conveyor mechanism and frame system that will adequately and safely support the required equipment and that is capable of assembly in a variety of configurations, while permitting thorough, hygienic cleaning of the conveyor with virtually no disassembly required.

SUMMARY OF THE INVENTION

The present invention relates to an improved sanitary conveyor frame used in combination with a sanitary conveyor mechanism including a motor-driven endless conveyor belt for transporting articles and mounted on legs above a support surface. The improvement comprises an elongated conveyor support extending longitudinally along the length of the conveyor and the plurality of frame members, each one of the frame members being mounted on the conveyor support in spaced apart relation to another of the frame members. The frame members each comprise a support aperture formed therethrough, with the support aperture being dimensioned and configured to receive the conveyor support in surrounding, supporting relation thereto. Each of the frame members further comprise a plurality of arms extending outwardly from the support aperture along a first plane that is substantially normal to the axis of the support aperture. Formed at the end of each of the arms is a leg that is disposed in substantially parallel relation to the axis of the support aperture.

Each of the frame members further comprise a plurality of first connector apertures, with one first connector aperture being formed between each of the arms and the support aperture. As will be described in a preferred embodiment of the invention, below, these first connector apertures are used, in combination with standard connectors such as, for example, nuts and bolts, to assemble various configurations for the conveyor system and to provide for the attachment of upper guide rails for the articles being conveyed and leg brackets for the attachment of support legs.

Formed through each of the legs of each support member is a second connector aperture, and these second connector apertures are provided for attachment of track guides, again by any suitable fastening means such as, for example, nuts and bolts, to receive and retain the endless conveyor belt, operatively, on the sanitary conveyor mechanism.

The invention accordingly comprises the features of construction, combinations of elements, and arrangements of parts which will be exemplified in the constructions hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings, in which.

Similar reference characters refer to similar parts throughout the several views of the drawings.

DETAILED DESCRIPTION OF THE INVENTION

Figure 6:
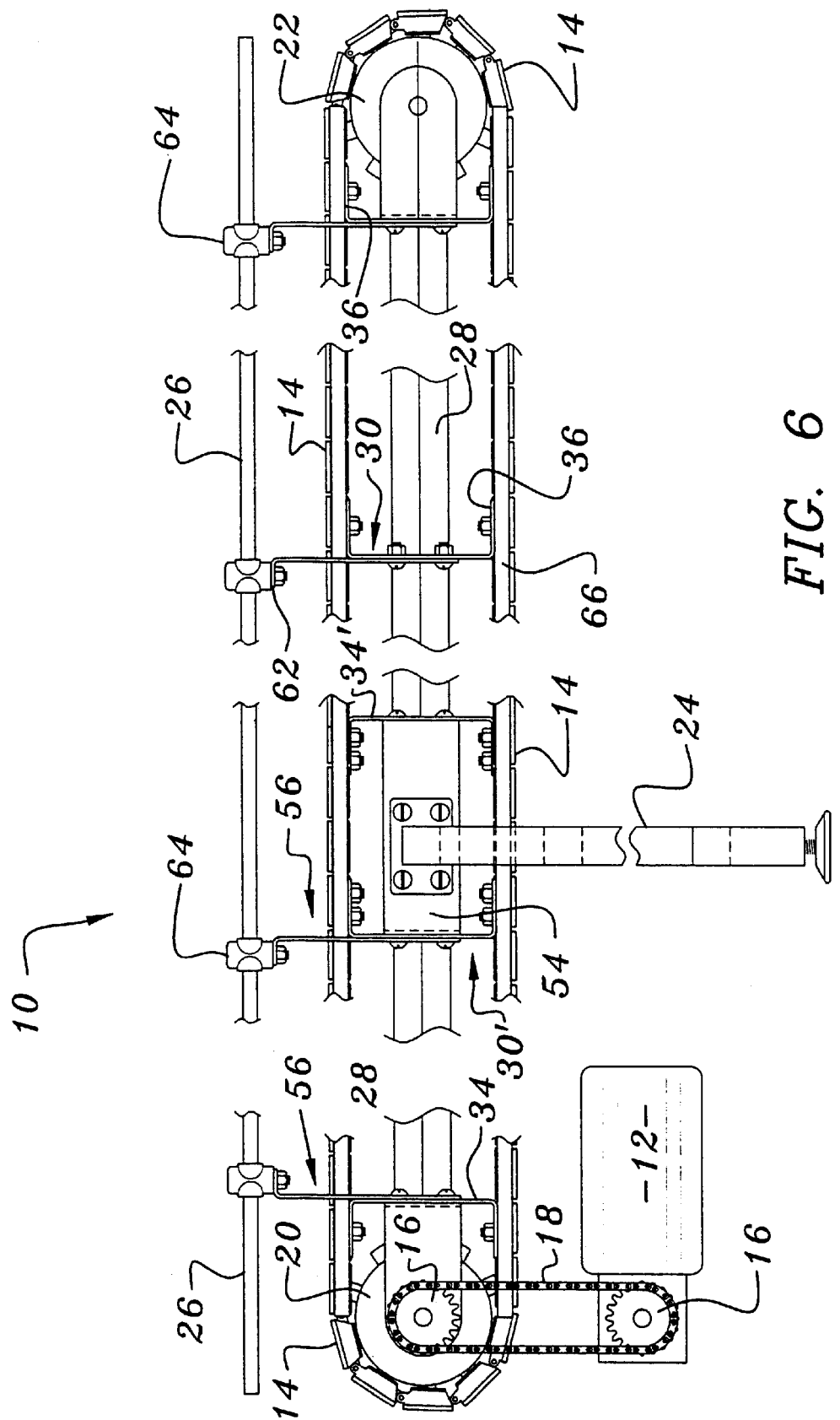
FIG. 6 is a fragmentary side elevation of the sanitary conveyor mechanism.

Attention is first invited to the view of FIG. 6, illustrating, in a fragmentary side elevation, a sanitary conveyor mechanism, generally indicated as 10, including the improved frame of this invention. A motor 10 drives endless conveyor belt 14 as by sprockets 16 and drive chain 18. Movement of conveyor belt 14 is accomplished as by drive roller 20 and one or more idler rollers 22. The conveyor 10 is disposed on a support surface (not shown) by adjustable legs 24. Disposed above conveyor belt 14 are preferably a pair of article guide rails 26, only one of which is visible in the elevation view of FIG. 6.

Figure 1:
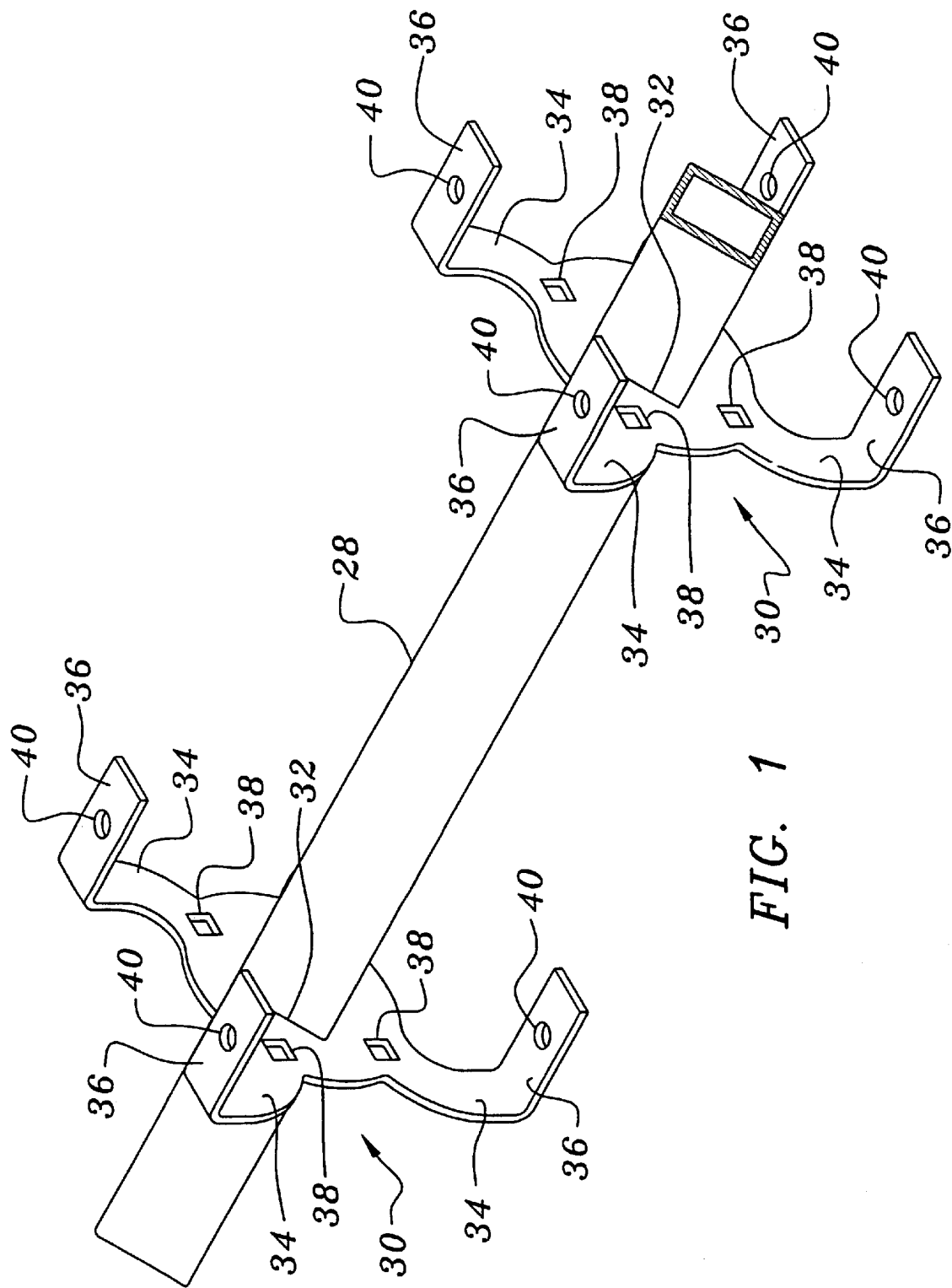
FIG. 1 is a perspective view of a preferred embodiment of the improved conveyor support and frame members.
Figure 8:
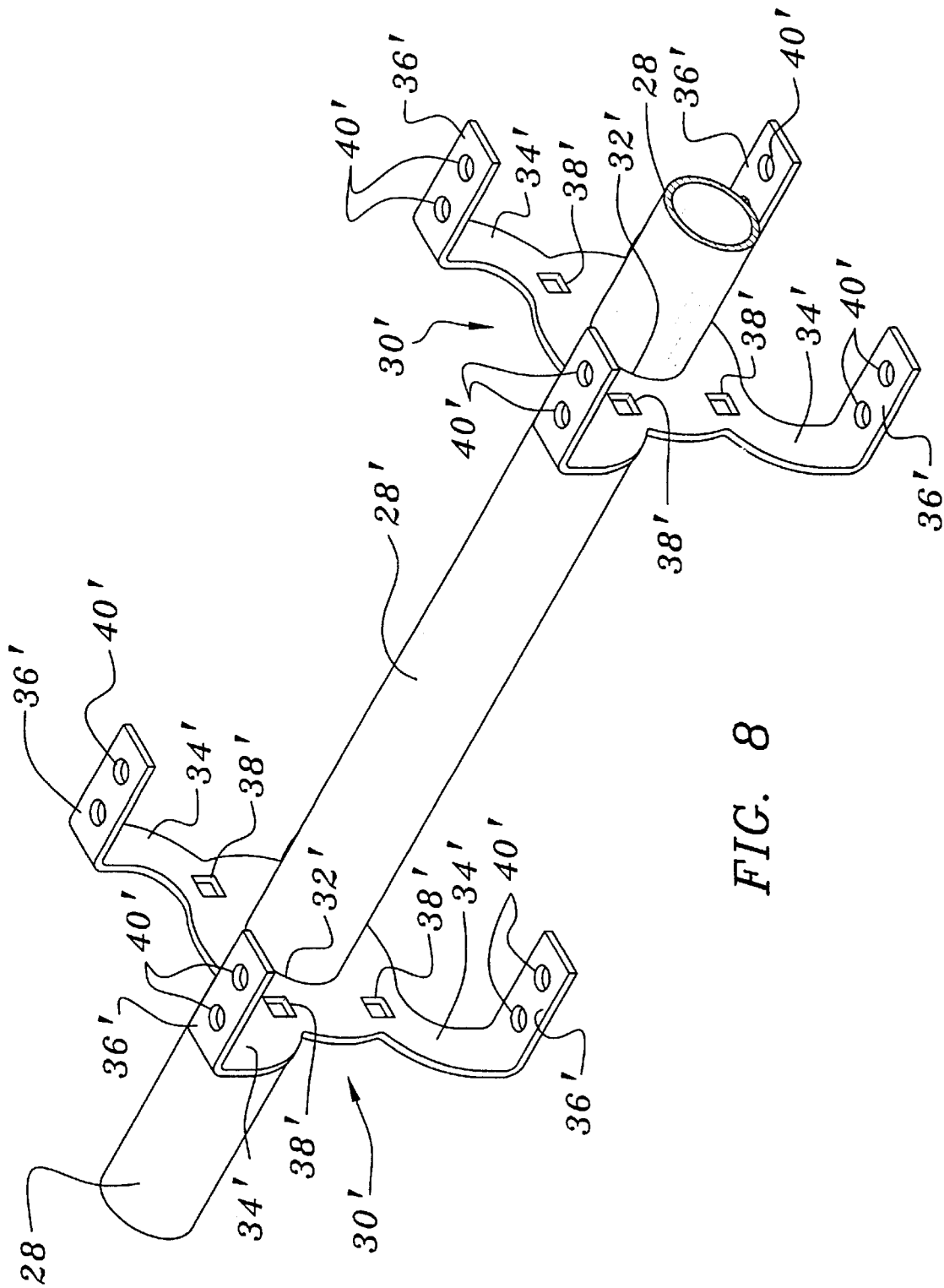
FIG. 8 is a perspective view similar to that of FIG. 1 showing a second preferred embodiment for the improved conveyor support and frame members.

The view of FIG. 1 illustrates a preferred embodiment for the improved elongated conveyor support 28 and frame members, generally indicated as 30. As shown in the view of FIG. 1, elongated conveyor support 28 defines a substantially square cross-section, and a corresponding support aperture 32 is provided through each of the frame members 30 to receive conveyor support 28 therethrough in surrounding, supporting relation. The view of FIG. 8 illustrates a second preferred embodiment for the elongated conveyor support 28' which defines a substantially circular cross-section. According to this second preferred embodiment, frame members 30' each comprise a corresponding circular support aperture 32'. All structural elements of the second preferred embodiment of FIG. 8 are identified by the same reference numeral as those elements in the view of FIG. 1, with the addition of a prime mark.

Returning to the view of FIG. 1, each of the frame members 30 further comprise a plurality of arms 34 extending outwardly from support aperture 32, and a corresponding plurality of legs 36 formed at the distal end of each arm 34, with legs 36 extending in a plane that is substantially parallel to the longitudinal axis of elongated conveyor support 28. Of course, one can also see that each of the arms 34 defines a plane that is substantially normal to the longitudinal axis of support 28. A first connector aperture 38 is formed through each of the frame members 30 between each of the arms 34 and the support aperture 32.

A second connector aperture is formed through each of the legs 36, and the utility of first connector aperture 38 and second connector apertures 40 is demonstrated hereinafter. With regard to the view of FIG. 8, one can see that a plurality of second connector apertures 40' may be provided in legs 36'.

Figure 2:
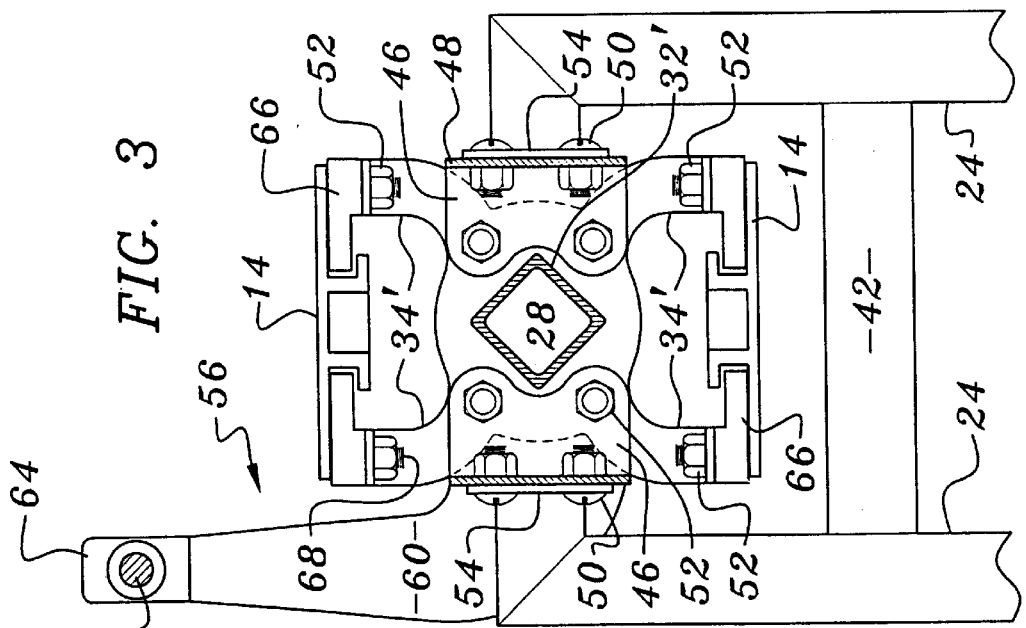
FIG. 2 is a fragmentary elevation of a segment of the sanitary conveyor showing an upper guide rail support and a leg bracket.
Figure 3:
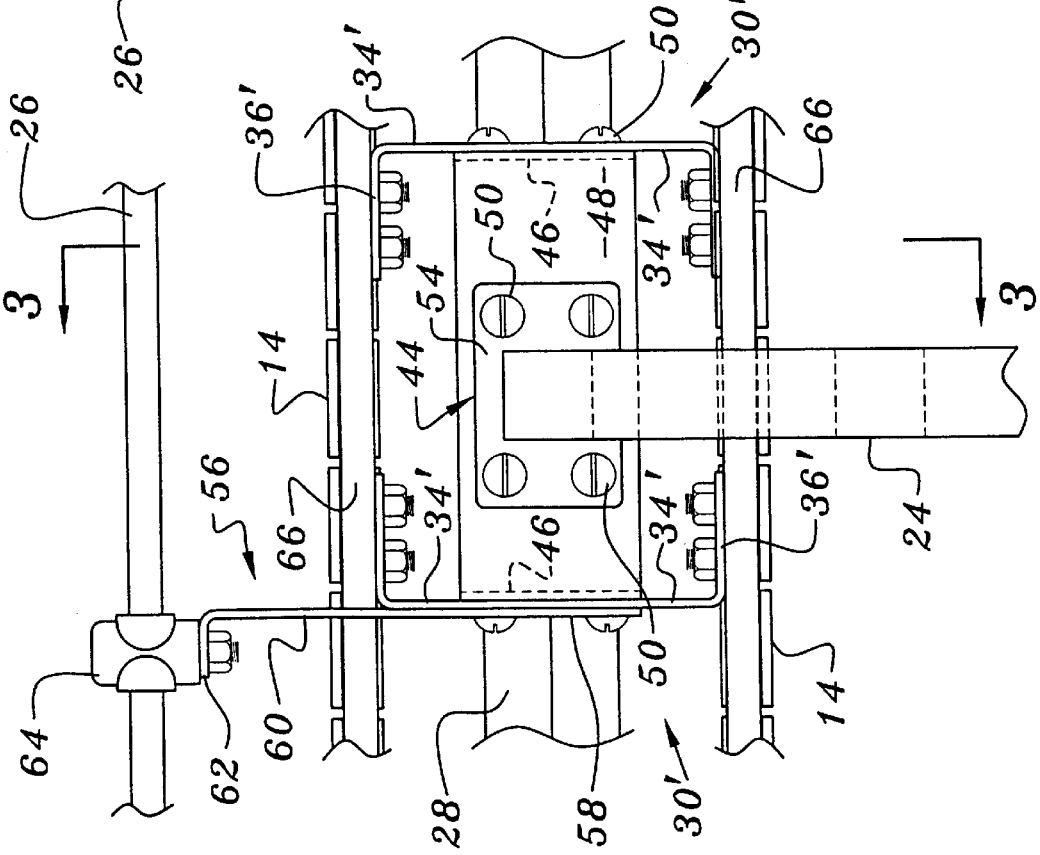
FIG. 3 is a sectional view taken along line 3—3 of FIG. 2.

Attention is now invited to the views of FIGS. 2 and 3, and it can be seen that FIG. 2 is a fragmentary, side elevation detail taken from the view of FIG. 6. Of course, FIG. 3 is a sectional view taken along line 3—3 of FIG. 2. A pair of legs 24 are shown in the sectional view of FIG. 3, and a leg brace 42 may be provided for increased strength and stability. Legs 24 are attached between an opposed pair of frame members 30' using a leg bracket generally indicated as 44.

Each of the leg brackets 44 is of a substantially U-shaped configuration having opposed parallel sides 46 and an interconnecting bracket base 48. A plurality of leg bracket apertures are formed through each of the sides 46 and are dimensioned and configured to correspond to first connector apertures 38' of frame members 30'. This permits attachment of leg bracket 44 between the pair of frame members 30' by any suitable means such as, for example, bolts 50 and nuts 52. Legs 24 are attached to bracket base 48 as by passing bolts 50 through apertures formed in bracket base 48 and leg plate 54, securing leg plate 54 to bracket base 48 by a nut 52 on each of the bolts 50. Turning to the views of FIGS. 4 and 5, one can see that the improvement provided by the sanitary conveyor frame of this invention may further comprise a plurality of upper guide rail supports, generally indicated as 56. Each upper guide rail support 56 is of a substantially L-shaped configuration and comprises a plurality of guide support apertures formed through shorter leg 58 with those apertures being dimensioned and configured to correspond to first connector apertures 38 of frame member 30. Thus, upper guide rail supports 56 may be attached to frame members 30 as by bolts 50 and nuts 52.

Figure 4:
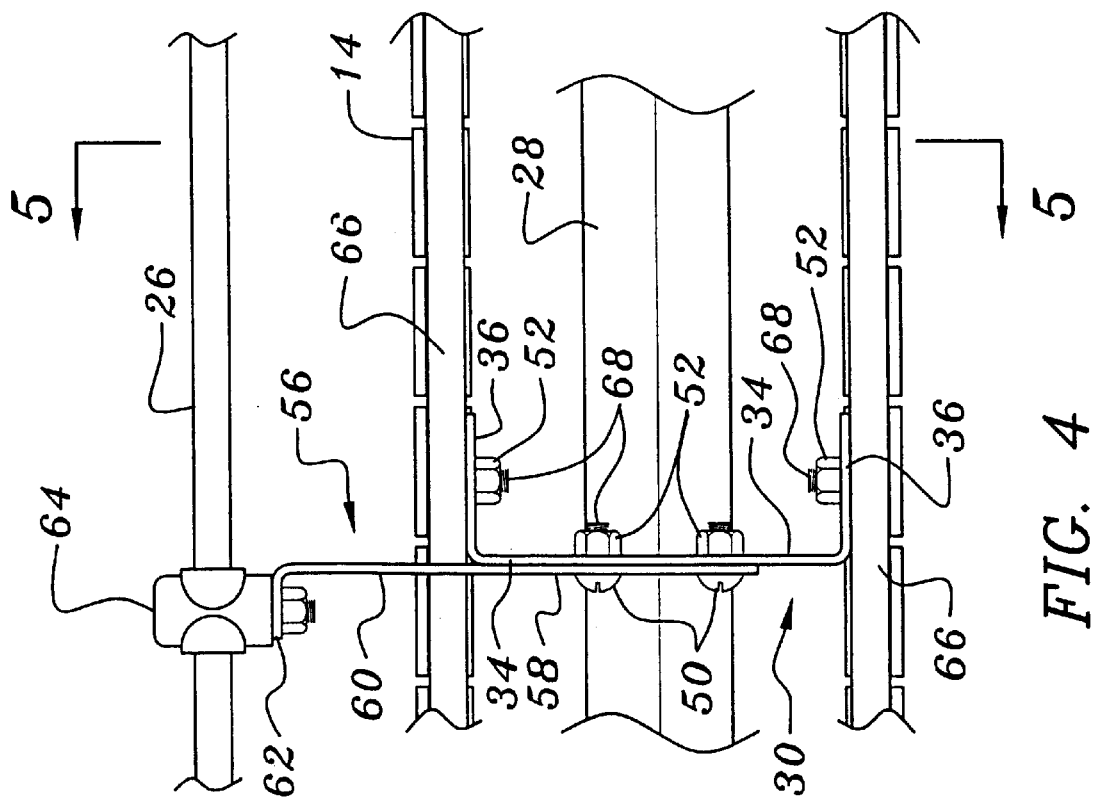
FIG. 4 is a fragmentary elevation of a segment of the sanitary conveyor showing a pair of upper guide rail supports.

Longer leg 60 of each of the upper guide rail supports 56 comprises a guide leg 62 formed at its distal end, and a rail aperture is formed through guide leg 62. As best seen in the view of FIG. 4, a rail bracket 64 may be attached to guide leg 62 for receiving and holding article guide rail 26 therethrough. While opposed pairs of upper guide rails supports 56 are illustrated in the views of FIGS. 4 and 5, only a single upper guide rail support 56 is shown in the views of FIGS. 2 and 3.

However, as can clearly be seen in the views of FIGS. 2 and 3, upper guide rail support 56 may be operatively attached to a frame member 30' even when a leg bracket 44 is also attached to the same frame member 30'. Of course, it is to be understood that a structure substantially similar to that shown in FIGS. 2 and 3 could be accomplished utilizing a frame member 30, as shown in the FIGS. 4 and 5.

Figure 5:
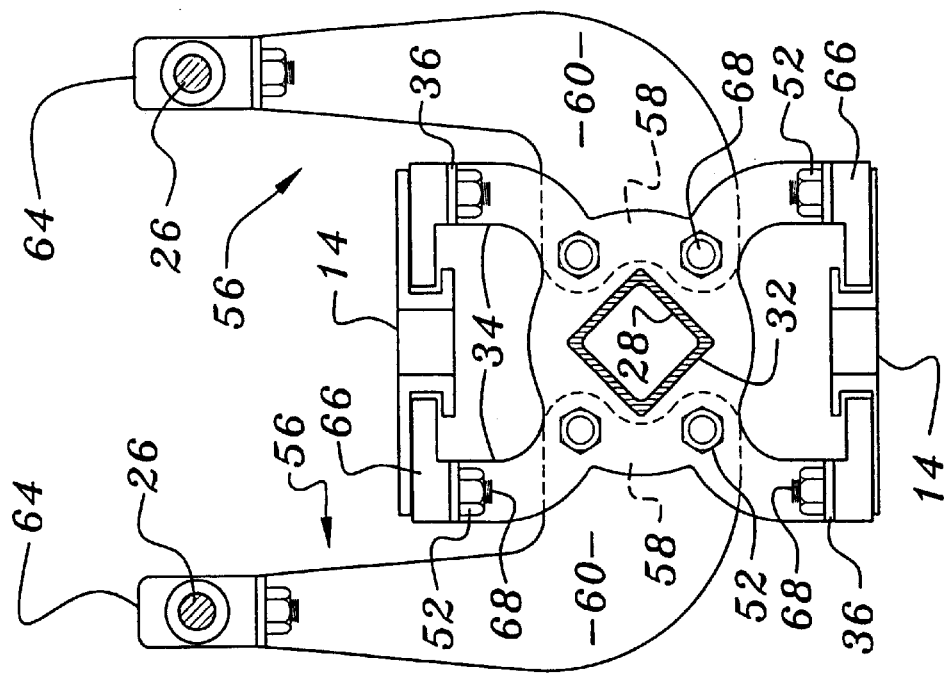
FIG. 5 is a sectional view taken along line 5—5 of FIG. 4.

The views of FIGS. 4 and 5 further illustrate the attachment of a plurality of track guides 66 to legs 36 of frame members 30. Track guides 66 are attached to legs 36 by any suitable fastener such as flathead bolts 68 and nuts 52. The track guides are configured so as to receive and retain endless conveyor belt 14 thereon in operative relation. Of course, as shown in the views of FIGS. 2 and 3, track guides 66 are also attachable to legs 36'.

Figure 7:
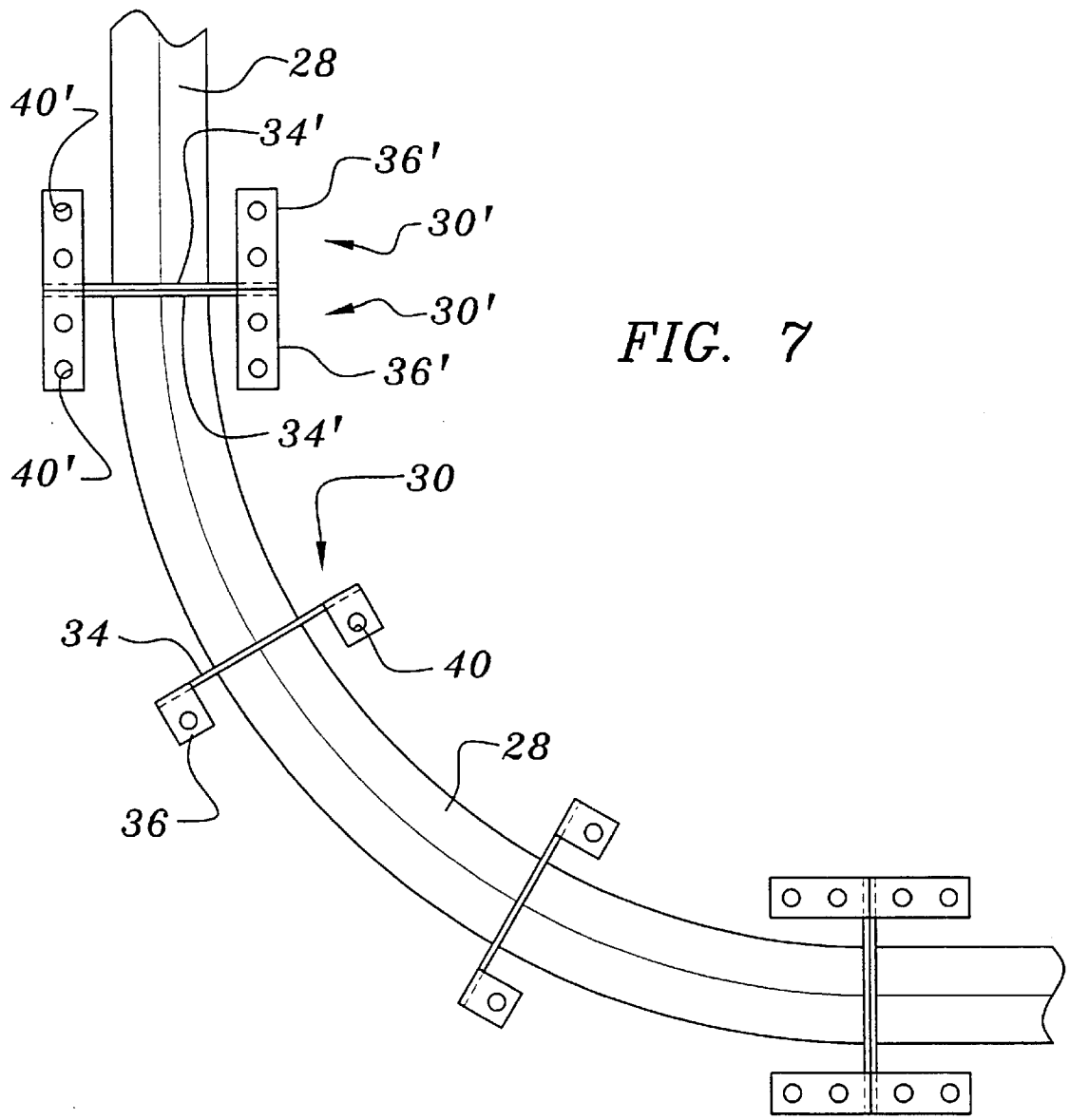
FIG. 7 is a top, plan view illustrating a segment of a curved sanitary conveyor.

The rather schematic top plan view of FIG. 7 is provided to illustrate the use of variety of frame members 30 and 30', in combination with segments of elongated conveyor support 28, to permit the construction of sanitary conveyor mechanisms 10 of virtually any necessary or desirable length or configuration.

Having thus set forth preferred embodiments for the improved sanitary conveyor frame of this invention, it is also to be noted that, according to known industry standards, antimicrobial materials would preferably be utilized on conveyor belt 14 and all joints between the segments of belt 14. Referring to the view of FIG. 6, it can be seen and appreciated that the improvement provided by the present invention results in a sanitary conveyor mechanism having virtually no hidden, covered nor enclosed parts where organic material might collect, thereby detracting from the sanitary condition of the mechanism. Furthermore, routine cleaning and maintenance of a sanitary conveyor mechanism constructed in accord with this invention is not only easier, but also much more efficient.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between.

Now that the invention has been described,
What is claimed is:
1. In a sanitary conveyor mechanism including a motor-driven endless conveyor belt for transporting articles and mounted on legs above a support surface, the improvement comprising: an elongated conveyor support extending longitudinally along the length of the conveyor; a plurality of frame members, each one of said plurality of frame members being-mounted on said conveyor support in spaced apart relation to at least one other of said plurality of frame members, each one of said plurality of frame members comprising a support aperture formed therethrough such that the axis of said support aperture is substantially normal to its corresponding frame member, said support apertures each being dimensioned and configured to receive said conveyor support therethrough in surrounding, supporting relation thereto, each one of said plurality of frame members further comprising a plurality of arms extending outwardly from said support aperture along a first plane that is substantially normal to said axis of said support aperture, and each one of said plurality of frame members further comprising a plurality of legs, one of said plurality of legs being formed on each one of said plurality of arms in substantially parallel relation to said axis of said support aperture, each one of said plurality of frame members further comprising a plurality of first connector apertures, one of each of said plurality of first connector apertures being formed between each of said plurality of arms and said support aperture and each one of said plurality of frame members further comprising a plurality of second connector apertures, one of each of said plurality of second connector apertures being formed through a corresponding one of each of said plurality of legs; and an upper guide rail support, said upper guide rail support comprising a substantially L-shaped member and having a plurality of guide support apertures formed through the shorter leg of said L-shaped member, said plurality of guide support apertures being dimensioned and configured to correspond to a corresponding plurality of said first connector apertures, whereby said upper guide rail support may be attached to one of said plurality of frame members by a connector extending through each of said corresponding first connector apertures and said plurality of guide support apertures.

2. In a sanitary conveyor mechanism as in claim 1, said upper guide rail support further comprising a guide leg formed on the distal end of the longer leg of said L-shaped member in substantially normal relation to the longer leg, said guide leg comprising a rail aperture formed therethrough.

3. In a sanitary conveyor mechanism as in claim 1, the improvement further comprising a leg bracket, said leg bracket comprising a substantially U-shaped member and having a plurality of leg bracket apertures formed through each of the parallel sides of said U-shaped member, said plurality of leg bracket apertures being dimensioned and configured to correspond to a corresponding plurality of said first connector apertures, whereby said leg bracket may be attached to a pair of said plurality of frame members, one of said pair of frame members being positioned in abutting relation to each one of said parallel sides of said U-shaped member by a connector extending through each one of said corresponding first connector apertures and said plurality of leg bracket apertures.

4. In a sanitary conveyor mechanism as in claim 1, the improvement further comprising a plurality of track guides, one of each of said plurality of track guides being attached to each of said plurality of legs in receiving relation to the endless conveyor belt.

* * * * *